Sept. 25, 1934.  A. W. TONDREAU  1,974,759
SHUTTER FOR MOTION PICTURE MACHINES
Filed Feb. 8, 1932  2 Sheets-Sheet 1
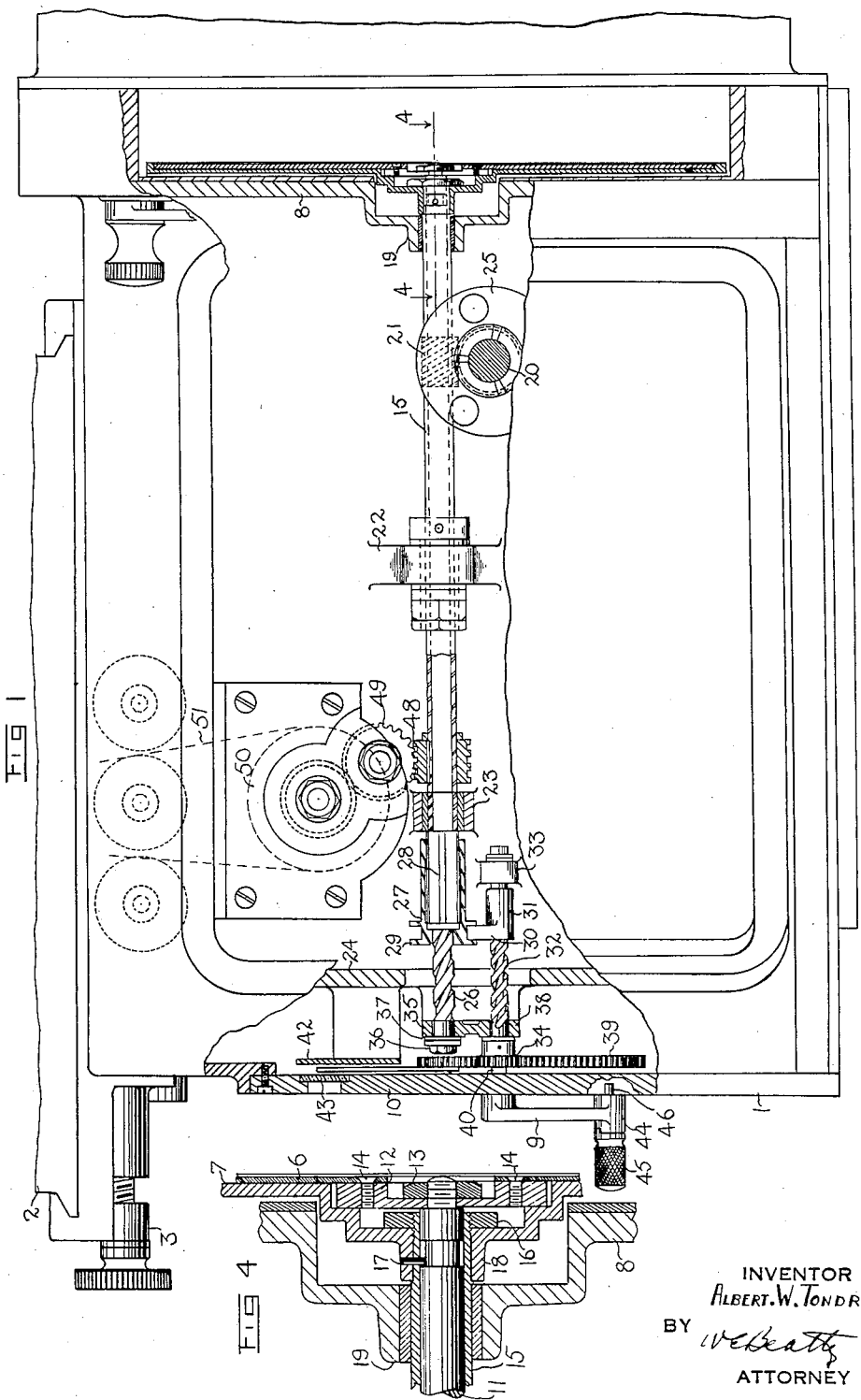
INVENTOR
Albert. W. Tondreau.
BY
ATTORNEY Sept. 25, 1934.  A. W. TONDREAU  1,974,759
SHUTTER FOR MOTION PICTURE MACHINES
Filed Feb. 8, 1932  2 Sheets-Sheet 2
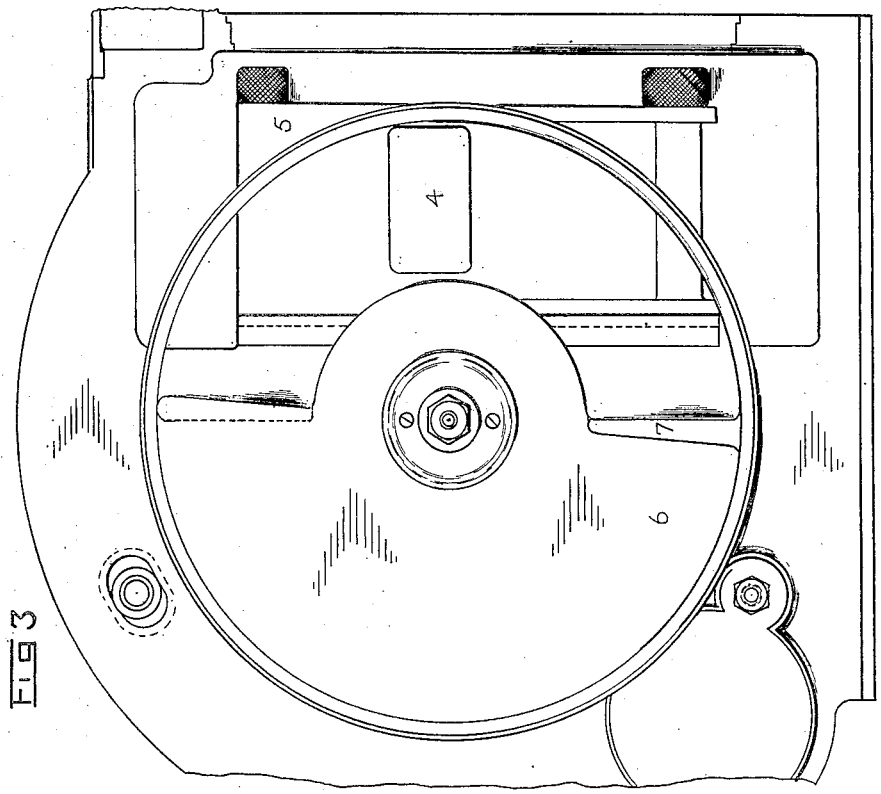
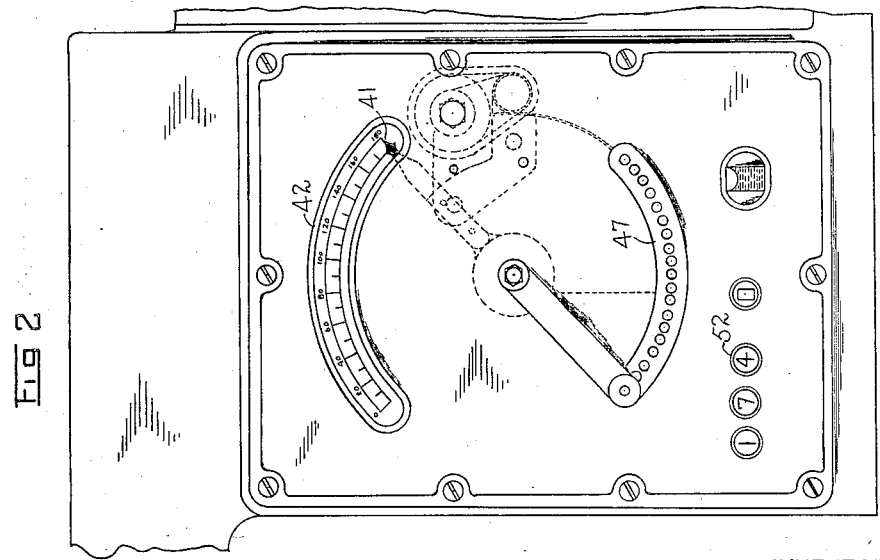
INVENTOR
ALBERT.W.TONDREAU.
BY *W E Beatty*
ATTORNEY Patented Sept. 25, 1934

1,974,759

UNITED STATES PATENT OFFICE 1,974,759

SHUTTER FOR MOTION PICTURE MACHINES

Albert W. Tondreau, Hollywood, Calif., assignor to Warner Bros. Pictures, Inc., New York, N. Y., a corporation of Delaware Application February 8, 1932, Serial No. 591,562

8 Claims. (Cl. 88—19.3)

The invention relates to a shutter for motion picture machines, particularly cameras, whereby the shutter opening may be varied during the operation of the camera to photograph a scene.

Variable shutters for cameras have heretofore been proposed, the shutter elements being mounted on concentric shafts which are angularly adjustable to vary the shutter opening. According to one prior construction, the means for coupling the two shafts together is arranged close to the shutter elements and extends the full depth of the camera. Furthermore, in this construction, the power is supplied at the ends of the concentric shafts by a gear arranged at right angles thereto.

An object of the present invention is to improve such constructions by separating the power drive for the shafts from the shaft interlock, whereby the shafts may be rigidly supported to insure quiet operation.

The invention also provides a lock for the handle of the adjustable shutter, whereby it will maintain a desired setting during the operation of the camera.

For further details of the invention, reference may be made to the drawings, wherein Fig. 1 is an elevation, partly in section, of the shutter mechanism;

Fig. 2 is an end elevation of Fig. 1, showing the shutter handle and the inner and locked shaft;

Fig. 3 is an end elevation looking towards the right-hand side of Fig. 1; and

Fig. 4 is an enlarged sectional view showing how the concentric shafts are fastened to their respective shutter elements.

Referring to Fig. 1, which illustrates a camera, the casing 1 is provided with a suitable support, such as a tripod (not illustrated), and negative film (not shown) is supplied thereto from the film magazine 2. This magazine 2 is held in position on top of the camera by means of a suitable lock 3. The negative film is progressed through the camera by a suitable pull-down mechanism (not shown), and the film is exposed at the opening 4 in the gate 5. In front of the gate 5 are positioned the rotatable shutter elements 6 and 7, which lie adjacent the front wall 8 of the camera and the separation of which may be varied by operating the handle 9, which is rotatable in a plane parallel to the opposite wall 10.

The outer shutter element 6, as shown in Fig. 4, is fastened to the inner shaft 11 by means of a ring 12 clamped to the threaded end of shaft 11 by nut 13, the ring 12 in turn being fastened to the shutter 6 by screw bolts 14.

The inner shutter element 7 is fastened to the hollow shaft 15, which is concentric with shaft 11. Shutter 7 is fastened to shaft 15 by means of the lock nut 16 in threaded engagement with the end of shaft 15 and by means of the locking pin 17 which locks the circular base 18 of shutter 7 to the shaft 15.

The front wall 8 of the camera is provided with bearing 19 for supporting the shafts 11 and 15. These two shafts extend substantially to the opposite wall 10 of the camera, and at points intermediate the end thereof the motor driven shaft 20 is geared to the shaft 15 by means of gear 21 to rotate both shafts 11 and 15, which are adjustably locked together, and the shutters 6 and 7 carried thereby.

The side wall of the camera casing is provided with a bearing 22 in order to support the shafts 11 and 15 at approximately their central portion, and with a bearing 23 to similarly support said shafts at a point adjacent the wall 10 or 24 of the camera.

The power shaft 20 is connected to the driving motor (not shown) by a flexible coupling 25, as is well understood in the art.

The end of shaft 11 adjacent wall 10 is provided with a screw thread 26 co-operating with a similar internal thread on splined nut 27, which is splined by ribs 28 and corresponding recesses in the nut 27 onto the outer shaft 15. The nut 27 is provided with a recessed collar 29 which receives an extension 30 on the traveling nut 31 mounted on the screw threaded counter-shaft 32, which is parallel to shaft 11 and supported by bearings 33 and 34.

The left-hand extension of the screw threaded portion 26 is supported in a bearing 35. An end plate in this bearing is provided by nut 36 and washers 37 mounted on the extension of the threaded portion 26.

The bearings 34 and 35 are provided in an extension of the wall 24, as shown.

In order to advance the nut 31 and thereby vary the separation of the shutters, the counter-shaft 32 terminates at its left end in a pinion 38 meshed with a mutilated gear 39, the latter being mounted on shaft 40, to which the handle 9 is connected.

The mutilated gear 39 is provided with a pointer 41 co-operating with a scale 42 arranged behind the arcuate window 43. The dial 42 is calibrated to show the degree of shutter opening, this opening varying in the case illustrated, from zero to 180°.

In order to lock the handle 9 in its selected position, the end 44 of this handle is provided with a spring-pressed detent 45, the locking detent 46 of which is received by the arcuately arranged apertures 47 to lock the handle 9 in a desired position.

At a point intermediate the ends of the shafts 11 and 15, for example, between the bearings 22 and 23, power is derived from the rotating shafts 11 and 15 by means of the gear 48 fastened to the outermost shaft 15 and meshing with the pinion 49 for driving suitable mechanism, such as a pulley 50, which is coupled to the take-up magazine (not shown) by belt 51. Power may thus be derived from these rotating shafts for other purposes, however, such as for operating the footage meter 52 illustrated in Fig. 2.

From the above description, it will be apparent that the rotating shafts 11 and 15 are rigidly supported by bearings 19, 22 and 23, and that power is supplied to and drawn from these shafts at points intermediate the ends thereof, thereby providing a rigid construction which is quiet in operation. Furthermore, the handle 9 provides means for varying the shutter opening, even during rotation of the shutter and for adjustably locking the shutters together with a desired shutter opening.

Having thus described the invention, what is claimed and desired to secure by Letters Patent is:

1. A motion picture camera having end walls and comprising separable shutters, concentric shafts on which said shutters are mounted, means for supporting said shafts from said walls, a power drive for said shutters, means for varying the separation of said shutters comprising a nut splined to one of said shafts and geared to the other of said shafts, means for longitudinally moving said nut comprising a counter-shaft, means for supporting said counter-shaft parallel to said concentric shafts, a handle for rotating said counter shaft, a traveling nut carried by said counter-shaft, and a connection between said traveling nut and said first mentioned nut, said concentric shafts, said counter-shaft and said nuts being within the space defined by said end walls of said camera.

2. A motion picture camera having end walls and comprising separable shutters, concentric shafts on which said shutters are mounted, means for supporting said shafts from said walls, a power drive for said shutters, means for varying the separation of said shutters comprising a nut splined to one of said shafts and geared to the other of said shafts, means for longitudinally moving said nut comprising a counter-shaft, means for supporting said counter-shaft parallel to said concentric shafts, a handle for rotating said counter-shaft, a traveling nut carried by said counter-shaft, a connection between said traveling nut and said first mentioned nut, said concentric shafts, said counter-shaft, and said nuts being within the space defined by said end walls of said camera, a film container for film supply and takeup, means for removably supporting said container at the top of said camera, film driving means for said container, and means for coupling said film driving means to the outer one of said concentric shafts at a point between said nut and said shutters.

3. A motion picture camera comprising a casing having front, top and back walls, means for removably supporting a film container on said top wall, separable shutters adjacent said front wall, concentric shafts on which said shutters are mounted, bearings for said shafts, a power drive connected to the outer one of said shafts, a film drive for said container connected to the outer one of said shafts, a cam device interconnecting said shafts for varying the angular relation thereof, said cam device being located between the point of connection of said outer shaft to said film drive and said back wall of said camera, and means comprising a handle at said back wall for operating said cam device to vary the opening of said shutters.

4. A motion picture camera comprising a casing having front, top and back walls, means for removably supporting a film container on said top wall, separable shutters adjacent said front wall, concentric shafts on which said shutters are mounted, bearings for said shafts, a power drive connected to the outer one of said shafts, a film drive for said container connected to the outer one of said shafts, a nut splined to one of said shafts and threaded to the other thereof, said nut being located between the point of connection of said outer shaft to said film drive and said back wall of said camera, and means comprising a handle at said back wall for longitudinally moving said nut to vary the opening of said shutters.

5. A motion picture camera comprising a casing having front and back walls, means for removably supporting a film container on top of said camera, separable shutters adjacent said front wall, concentric shafts on which said shutters are mounted, a front bearing for the outer one of said shafts adjacent said front wall, a back bearing for said outer shaft adjacent said back wall, a mid-bearing for an intermediate portion of said outer shaft, a bearing adjacent said back wall for the inner one of said shafts, a power drive connected to the outer one of said shafts between said front bearing and said mid-bearing, a film drive for said container connected to the outer one of said shafts, between said mid-bearing and said back bearing, a nut splined to one of said shafts and threaded to the other thereof, said nut being located between said back bearing and said back wall, and means comprising a handle at said back wall for longitudinally moving said nut to vary the opening of said shutters.

6. A motion picture camera comprising a casing having a front wall, also inner and outer back walls spaced apart, separable shutters adjacent said front wall, concentric shafts on which said shutters are mounted, said shafts extending from said front wall to a point adjacent said inner back wall, means for supporting said shafts for rotation, means for rotating said shafts, means comprising a nut adjacent said inner back wall for varying the separation of said shutters, said nut being splined to one of said shafts and threaded to the other thereof, and means comprising a gear train mounted between said inner and outer back walls for longitudinally moving said nut to vary the separation of said shutters.

7. A motion picture camera comprising a casing having a front wall, also inner and outer back walls spaced apart, separable shutters adjacent said front wall, concentric shafts on which said shutters are mounted, said shafts extending from said front wall to a point adjacent said inner back wall, means surrounding both of said shafts for supporting the same for rotation, a bearing on said inner back wall for the inner one of said shafts, means for rotating said shafts, means comprising a nut adjacent said inner back wall for varying the separation of said shutters, said nut being splined to one of said shafts and threaded to the other thereof, and means comprising a gear train mounted between said inner and outer back walls for longitudinally moving said nut to vary the separation of said shutters.

8. A motion picture camera comprising a casing having a front wall, also inner and outer back walls spaced apart, separable shutters adjacent said front wall, concentric shafts on which said shutters are mounted, said shafts extending from said front wall to a point adjacent said inner back wall, means for supporting said shafts for rotation, means for rotating said shafts, means comprising a nut adjacent said inner back wall for varying the separation of said shutters, said nut being splined to one of said shafts and threaded to the other thereof, a threaded counter-shaft at the side of the inner one of said concentric shafts, bearing supports for said counter-shaft, and means comprising a handle mounted on said outer back wall for operating said counter-shaft to longitudinally displace said nut and thereby vary the separation of said shutters.

ALBERT W. TONDREAU.